United States Patent
Sekiguchi et al.

(10) Patent No.: US 7,728,874 B2
(45) Date of Patent: Jun. 1, 2010

(54) VIDEO CAMERA APPARATUS

(75) Inventors: Masami Sekiguchi, Kanagawa (JP);
Shogo Kawata, Kanagawa (JP);
Yasutaka Kotani, Tokyo (JP)

(73) Assignee: Sony Corporation, Tokyo (JP)

( * ) Notice: Subject to any disclaimer, the term of this patent is extended or adjusted under 35 U.S.C. 154(b) by 843 days.

(21) Appl. No.: 11/182,755

(22) Filed: Jul. 18, 2005

(65) Prior Publication Data

US 2006/0023081 A1 Feb. 2, 2006

(30) Foreign Application Priority Data

Jul. 30, 2004 (JP) .............................. 2004-223461

(51) Int. Cl.
*H04N 5/225* (2006.01)
*H04R 1/02* (2006.01)

(52) U.S. Cl. .................................. 348/207.99; 381/91

(58) Field of Classification Search ...................... 348/2, 348/92, 231.3, 231.4, 207.99, 211.1, 211.2, 348/81; 381/91
See application file for complete search history.

(56) References Cited

U.S. PATENT DOCUMENTS

| 5,874,947 A | | 2/1999 | Lin | |
|---|---|---|---|---|
| 2002/0068600 A1 | * | 6/2002 | Chihara et al. | 455/550 |
| 2003/0011685 A1 | * | 1/2003 | Oka et al. | 348/211.2 |
| 2003/0087667 A1 | | 5/2003 | Taniguchi et al. | |
| 2003/0151663 A1 | | 8/2003 | Lorenzetti et al. | |

FOREIGN PATENT DOCUMENTS

| CN | 2482770 Y | | 3/2002 |
|---|---|---|---|
| JP | 03-034799 | * | 2/1991 |
| JP | 04-240974 | | 8/1992 |
| JP | 09-083854 | | 3/1997 |
| JP | 09-083854 A | | 3/1997 |
| JP | 11-075280 A | | 3/1999 |
| JP | 11-155092 | | 6/1999 |
| JP | 2003-208184 A | | 7/2003 |
| JP | 2003-209782 A | | 7/2003 |

OTHER PUBLICATIONS

U.K. Patent Office Search and Examination Report mailed Sep. 8, 2005.
Camcordski (http://www.manchestermovies.com/camcordski-01.shtml).
Sony DNW-7 camcorder (http://www.vtcorp.com/htm/whatwasnewfor2003.htm).
Japanese Office Action dated Apr. 7, 2008 for corresponding Japanese Application No. 2001-223461.
English Translation of the Chinese Office Action issued Apr. 6, 2007 for corresponding Chinese Application No. 200510088140.X.
Chinese Office Action issued Sep. 21, 2007 for corresponding Chinese Application No. 200510088140.X.

* cited by examiner

*Primary Examiner*—Jason Chan
*Assistant Examiner*—Joel Fosselman
(74) *Attorney, Agent, or Firm*—Rader, Fishman & Grauer PLLC

(57) ABSTRACT

A video camera apparatus provided with image capturing means, which includes: audio communication means for receiving an audio signal from a wireless microphone of a subject through short-range wireless data communication means; and recording means for recording image information of the subject captured by the image capturing means and an audio signal received by the audio communication means.

11 Claims, 2 Drawing Sheets

VIDEO CAMERA APPARATUS

BACKGROUND OF THE INVENTION

1. Field of the Invention

The present invention relates to a video camera apparatus, more particularly, to a video camera apparatus using a video camera and a wireless microphone capable of authenticating each other by using of a short-range wireless data communication function, such as the Bluetooth, configured such that sound from the wireless microphone held by a subject can be recorded on the video camera.

2. Description of Related Art

An imaging apparatus in a related art has, as shown in FIG. 3, a remote monitor apparatus 100 provided with a microphone 101 and an image display unit 102, and connected to a camera 200 with an infrared ray emitted from an infrared transmission device 103 so that the camera 200 is remotely controlled, and an image captured by the camera 200 is displayed on the remote monitor apparatus 100 (Japanese Patent Application Publication No. Hei 11-155092).

SUMMARY OF THE INVENTION

In the imaging apparatus explained as the related art, however, since an audio signal is transmitted by using an infrared ray, a ray emitting section and a ray receiving section should be located within a visibility range, and an interference from the same apparatus of the other group may also occur, resulting in difficulty in recording a desired sound. In addition, since it is difficult for the imaging apparatus to recognize a situation of a signal identified, there is a disadvantage of recording erroneously a silent pause and sound break.

Therefore, the present invention provides an imaging apparatus capable of transmitting an audio signal from a subject to an image capturing side without breaking sound, and transmitting sound from the image capturing side to the subject.

In order to address the disadvantage mentioned above, a video camera apparatus of the present invention has a structure configured as below.

A video camera apparatus provided with image capturing means, which includes: audio communication means for receiving an audio signal from a wireless microphone of a subject through short-range wireless data communication means; and recording means for recording image information of the subject captured by the image capturing means and an audio signal received by the audio communication means. The short-range wireless data communication means is communication means employing the Bluetooth system. The short-range wireless data communication means is communication means used between the wireless microphone and the video camera, which are connected in a one-to-one relation based on an ID recognition system. In accordance with zoom information of the video camera and an angle of view of the subject, the recording means records while changing a mixing ratio of the audio signal from the wireless microphone and the audio signal from the built-in microphone of the video camera between 0% to 100%. The video camera apparatus that further includes: audio output means for output the audio signal from the video camera to the wireless microphone of the subject through the short-range wireless data communication means. The video camera apparatus that further includes: link display means for displaying as an icon a link state of the short-range wireless data communication means on an electronic view finder of the video camera. If the link of the short-range wireless data communication is disconnected, the recording means becomes stand-by state and switches to record the audio signal input from the built-in microphone of the video camera as an audio signal to be recorded, and if the link is recovered, the recording means immediately returns to an original mixing ratio to record. If a communication state of the short-range wireless data communication is poor and a number of data-resend occasions are increased than a predetermined set value, the recording means switches to record an audio signal input from the built-in microphone of the video camera as an audio signal to be recorded, and if the communication state is recovered, the recording means immediately returned to an original mixing ratio to record. A recording method that includes the steps of: receiving an audio signal from a wireless microphone of a subject through short-range wireless data communication; and recording the received audio signal together with captured image information of the subject.

Since an audio signal collected by the wireless microphone on the subject side is recorded by the video camera having the image capturing means, sound of even a distant subject can clearly be recorded, thereby realizing harmonious recording of an image and sound together. In addition, even if a similar video camera apparatus exists therearound, recording can be executed without interference from such video camera apparatus because the wireless microphone and the video camera are connected in a one-to-one relation. Further, because the short-range wireless data communication means uses interactive communication, images can capture while the subject and the camera operator talk each other, enabling an image intended by the camera operator to be captured. Furthermore, because wireless communication is used, communication is secured and does not break off even if the microphone is hidden behind the subject. Moreover, even if the communication becomes in a barely connected state, the communication can be recovered immediately and does not need resetting.

DESCRIPTION OF THE EMBODIMENT

In the following, an embodiment of a video camera apparatus according to the present invention is explained with reference to the drawings.

A video camera apparatus of the present invention includes: a wireless microphone having a short-range wireless data communication unit that collects and transmits sound by wireless, held by a subject; and a video camera receiving a desired sound produced by the subject from the wireless microphone to record the sound and the image simultaneously while capturing an image of the subject. Accordingly, it is possible, for example, to clearly record the sound of the distant subject, so that the image and the sound can be recorded together in a natural way. In this embodiment, the short-range wireless data communication unit is a communication unit according to the Bluetooth system, and this system enables interactive communication. A Bluetooth device for realizing the communication unit of the Bluetooth system uses a radio wave of 2.4 GHz band for transmitting and receiving data by wireless, and its maximum transfer rate is 1 Mbit/sec and its modulation system is GFSK (Gaussian Frequency Shift Keying). In addition, as the maximum transfer distance of the Bluetooth device, there are 10 m (1 mw output) and 100 m (100 mw output), and a selection is made according to an application.

When the Bluetooth device detects another communicable Bluetooth device (detects an electronic device having a Bluetooth device) located within a transferable distance range (hereinafter it is referred to a "in-range"), authentication processing is carried out mutually, and if authentication processing succeeds, data can be mutually delivered. Specifically, a controller of the Bluetooth controls a list of devices constituting a Bluetooth network, which is stored in a memory thereof on the basis of ID recognition. When the authentication on the bases of ID recognition succeeds, a device newly detected is registered on the list of devices. On the other hand, when a device in the list moves out of the in-range (hereinafter it is referred to an "out-range"), the controller deletes the device from the list stored in the memory. By this processing, the controller recognizes that communication through the Bluetooth network can be possible only for devices registered in the list. For that reason, in order to allow mutual communication between devices via the Bluetooth network, it is necessary to register their authentication information between various devices beforehand. In the embodiment, authentication information, that is ID, of a wireless microphone 11 (shown in FIG. 1) and a video camera 20 (shown in FIG. 2) is registered each other beforehand to establish communication only between them, so that they can not communicate with other devices.

Figure 1:
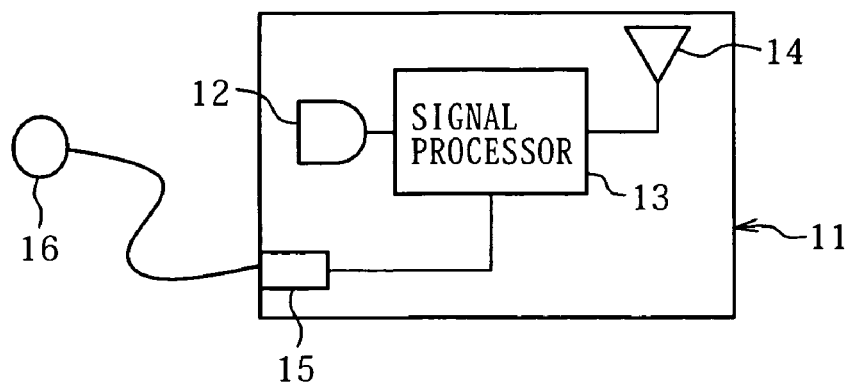
FIG. 1 is a block diagram showing a wireless microphone according to the present invention.

As shown in FIG. 1, the wireless microphone 11 is generally configured with a microphone 12, an earphone 16, an earphone terminal 15 to which the earphone 16 is connected, a signal processor 13 having a function for receiving and processing a signal from the microphone 12 and a signal received by a microphone-side antenna 14 to output them to the earphone 16 and having a Bluetooth device, and the microphone-side antenna 14 transmitting sound processed by the signal processor 13 and receiving an audio signal from the video camera.

Figure 2:
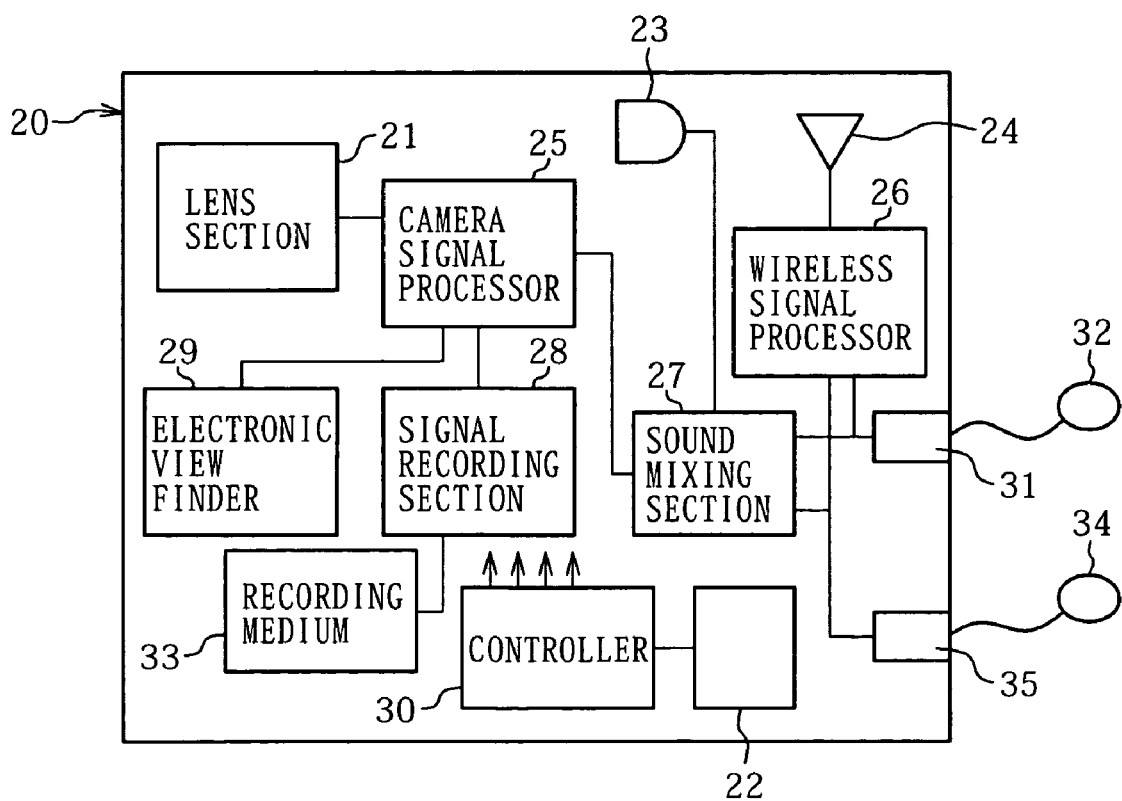
FIG. 2 is a block diagram showing a video camera according to the present invention.
Figure 3:
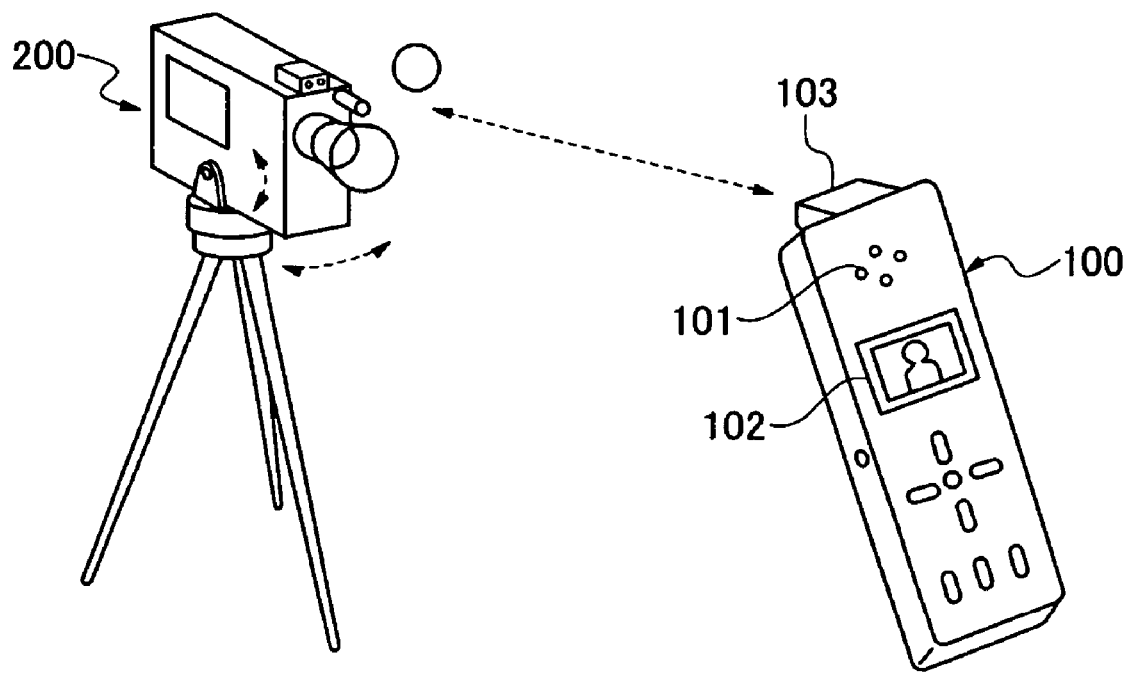
FIG. 3 is an illustration showing an imaging apparatus in a related art.

As shown in FIG. 2, the video camera 20 is configured with a lens section 21 capturing an image of a subject, a zoom lever 22 zooming a subject, a controller 30 controlling zooming, an electronic view finder 29, a recording medium 33 recording therein sounds and images captured, a signal recording section 28 controlling recording of the recording medium 33, a built-in microphone 23, a camera-operator microphone 32, a microphone terminal 31 to which the camera-operator microphone 32 is connected, a camera-operator earphone 34, a earphone terminal 35 connecting the camera-operator earphone 34, a sound mixing section 27 mixing sound collected by the camera-operator microphone 32 and sound sent from the wireless microphone 11, a wireless signal processor 26 having a Bluetooth device processing sound collected by the camera-operator microphone 32 so as to transmit via a video camera-side antenna 24 and processing an audio signal from the wireless microphone 11 (shown in FIG. 1), the video camera-side antenna 24, a camera signal processor 25 processing sound from the sound mixing section 27 and a signal of an image captured by the lens section 21.

Above described video camera apparatus composed of the wireless microphone 11 and the video camera 20 is operated as described below. At first, the wireless microphone 11 is held by a subject and sound of the subject is collected by the microphone 12, an audio signal is encoded into a Bluetooth signal by the signal processor 13 and the Bluetooth signal is transmitted from the microphone-side antenna 14. A Bluetooth signal from the video camera 20 is received by the microphone-side antenna 14 and demodulated into sound by the signal processor 13. Therefore, the subject can hear an action instruction from the camera operator or monitor sound to be recorded through the earphone 16 connected to the earphone terminal 15.

The video camera 20 converts an image of the subject into an electrical signal by the lens section 21 and it is processed into a video recording signal by the camera signal processor 25 and recorded on the recording medium 33 by the signal recording section 28. Sound is collected by the built-in microphone 23, and it is processed into a video recording signal by the camera signal processor 25 and recorded together with the image to the recording medium 33 by the signal record section 28. The Bluetooth signal transmitted from the wireless microphone 11 is received by the video camera-side antenna 24 and is decoded by the wireless signal processor 26. A position of the zoom lever 22 at the time of capturing images is detected by the controller 30 and an angle of view of the subject is detected by the camera signal processor 25, so that a distance to the subject is estimated. According to an obtained result, if a subject is located at a short distance, a mixing ratio of a signal from built-in microphone 23 and sound decoded by the wireless signal processor 26 is changed so as to increase a ratio of the signal from the built-in microphone 23, and the changed ratio is sent to the camera signal processor 25. On the other hand, if the subject is located at a long distance, a ratio of the sound from the wireless microphone 11 is increased. The ratio is set between 0% to 100%. Alternatively, instead of the sound from the built-in microphone 23, sound from the camera-operator microphone 32 may be mixed. Moreover, when the camera operator instructs an action to the subject holding the microphone 11, the sound is collected by the camera-operator microphone 32, and it is input from the microphone terminal 31 and encoded into a Bluetooth signal by the wireless signal processor 26 to be transmitted. Since the Bluetooth signal from the wireless microphone 11 is received by the video camera-side antenna 24, and decoded by the wireless signal processor 26, actions of the subject can be captured just as the camera operator intends. Further, although it is not shown, the audio signal to be recorded by the signal recording section 28 is encoded into the Bluetooth signal by the wireless signal processor 26 and sent to the wireless microphone 11, so that the subject can monitor sound to be recorded.

The Bluetooth communication between the wireless microphone 11 and the video camera 20 is set to be recognized by only both of them based on the ID recognition, and they link each other when their power sources are turned on. This linked state is detected by the controller 30 of the video camera 20, and it is displayed as an icon on the electronic view finder 29. The camera operator can stop or restart of capturing images as watching this icon. Even if the link between the video camera and the wireless microphone is disconnected, by making the Bluetooth communication to a standby state, they are possible to communicate immediately after recovery. When the link is disconnected, sound to be recorded is automatically switched to the sound from the built-in microphone 23, and when the link is recovered, it is returned to an original mixing ratio. Alternatively, it may remain to be recorded as silence instead of switching the sound, according to the setting. When the distance to the subject becomes far, the Bluetooth communication tries to receive data by requesting to resend the data, sound is recorded with delay because of a waiting time of processing, and it gives unnatural feeling to a viewer. When a number of resend requests are increased than a predetermined set value, sound to be recorded is automatically switched to the sound from the built-in microphone 23, and the number of resend requests are decreased than the set value, it is returned to the original mixing ratio. Alternatively, it may remain to be recorded as silence instead of switching the sound, according to the setting.

The present invention is to provide a video camera apparatus allowing a camera operator to capture images of a subject while having conversation with the subject. The video camera apparatus includes a wireless microphone, held by a subject, having functions as a collecting sound unit and an interactive communication unit, and a video camera having a recording unit for recording sound produced by the subject, and the subject can hear sound from the camera operator.

It should be understood by those skilled in the art that various modifications, combinations, sub-combinations and alterations may occur depending on design requirements and other factors insofar as they are within the scope of the appended claims or the equivalents thereof.

The present invention contains subject matter related to Japanese Patent Application JP2004-223461, filed in the Japanese Patent Office on Jul. 30, 2004, the entire contents of which being incorporated herein by reference.

What is claimed is:

1. A video camera apparatus provided with image capturing means, comprising:
    audio communication means including first audio communication means and second audio communication means, the first audio communication means operative for receiving an audio signal from a wireless microphone of a subject through short-range wireless data communication means, the second audio communication means in a form of a built-in microphone operative for directly receiving sound signals from the subject; and
    recording means for recording image information of the subject captured by the image capturing means and an audio signal received by the audio communication means,
    wherein, if a communication state of the short-range wireless data communication means is poor and a number of data-resend requests is greater than a predetermined set value, the recording means switches to record an audio signal input from the built-in microphone of the video camera as an audio signal to be recorded, and if the communication state is recovered, the recording means immediately returns to an original state.

2. The video camera apparatus according to claim 1, wherein the short-range wireless data communication means is communication means employing the Bluetooth system.

3. The video camera apparatus according to claim 1, wherein the short-range wireless data communication means is communication means used between the wireless microphone and the video camera, which are connected in a one-to-one relation based on an ID recognition system.

4. The video camera apparatus according to claim 1, wherein, in accordance with zoom information of the video camera and an angle of view of the subject, the recording means records while changing the mixing ratio of the audio signal from the wireless microphone and the audio signal from the built-in microphone of the video camera between 0% to 100%.

5. The video camera apparatus according to claim 1, further comprising:
    audio output means for output the audio signal from the video camera to the wireless microphone of the subject through the short-range wireless data communication means.

6. The video camera apparatus according to claim 1, further comprising:
    link display means for displaying as an icon a link state of the short-range wireless data communication means on an electronic view finder of the video camera.

7. The video camera apparatus according to claim 1, wherein, if the link of the short-range wireless data communication is disconnected, the recording means becomes stand-by state and switches to record the audio signal input from the built-in microphone of the video camera as an audio signal to be recorded, and if the link is recovered, the recording means immediately returns to an original state.

8. The video camera apparatus according to claim 1, further comprising signal processing means operative to process audio signals from the first audio communication means and sound signals from the second audio communication means such that the processed signals are mixed in a predetermined ratio depending upon whether the subject is located at a short distance or a long distance from the video camera apparatus.

9. A video camera apparatus provided with image capturing means, comprising:
    audio communication means for receiving an audio signal from a wireless microphone of a subject through short-range wireless data communication means; and
    recording means for recording image information of the subject captured by the image capturing means and an audio signal received by the audio communication means,
    wherein, if a communication state of the short-range wireless data communication is poor and a number of data-resend requests is greater than a predetermined set value, the recording means switches to record an audio signal input from the built-in microphone of the video camera as an audio signal to be recorded, and if the communication state is recovered, the recording means immediately returns to an original state.

10. A video camera apparatus provided with an image capturing unit, comprising:
    an audio communication unit including a first audio communication sub-unit and second audio communication sub-unit, the first audio communication sub-unit configured to receive an audio signal from a wireless microphone of a subject through a short-range wireless data communication unit, the second audio communication sub-unit in a form of a built-in microphone operative for directly receiving sound signals from the subject; and
    a recording unit configured to record image information of the subject captured by the image capturing unit and an audio signal received by the audio communication unit,
    wherein, if a communication state of the short-range wireless data communication unit is poor and a number of data-resend requests is greater than a predetermined set value, the recording unit switches to record an audio signal input from the built-in microphone of the video camera as an audio signal to be recorded, and if the communication state is recovered, the recording unit immediately returns to an original state.

11. The video camera apparatus according to claim 10, further comprising a signal processing unit operative to process audio signals from the first audio communication sub-unit and sound signals from the second audio communication sub-unit such that the processed signals are mixed in a predetermined ratio depending upon whether the subject is located at a short distance or a long distance from the video camera apparatus.

* * * * *